Figure 3:
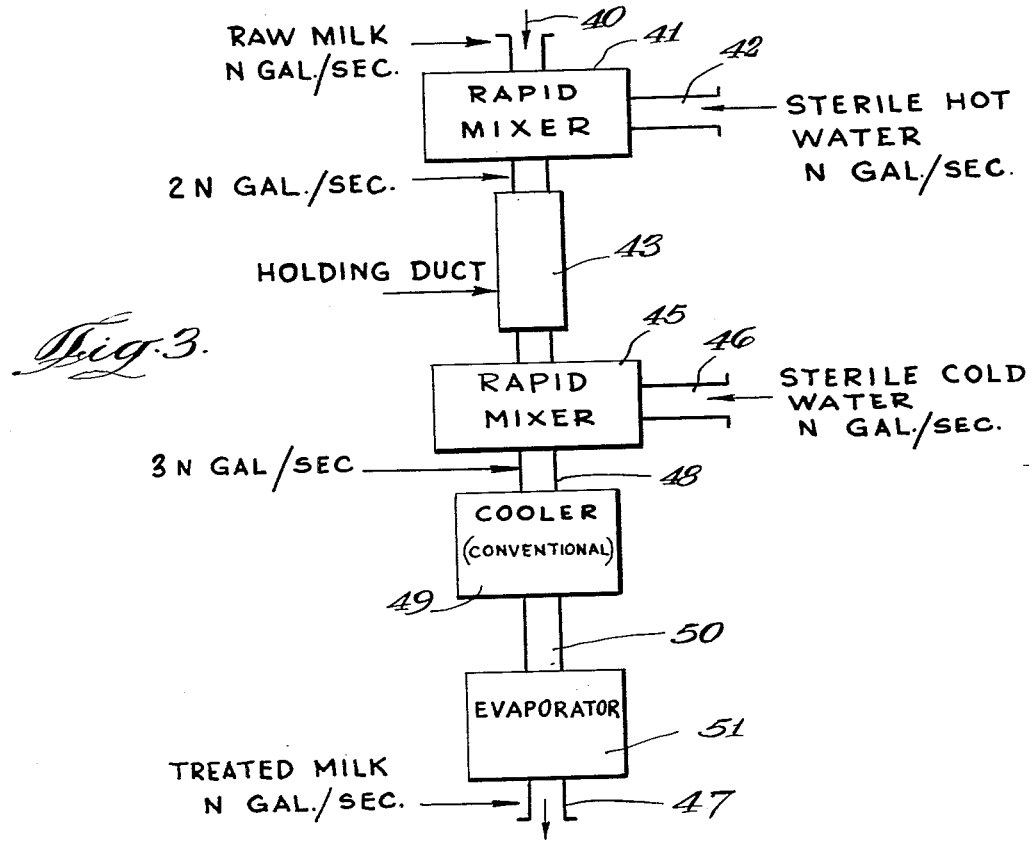

July 5, 1955     W. H. COULTER     2,712,504
METHOD FOR TREATMENT OF FLUIDS REQUIRING
STERILIZATION OR PASTEURIZATION
Filed Aug. 24, 1951     2 Sheets-Sheet 1
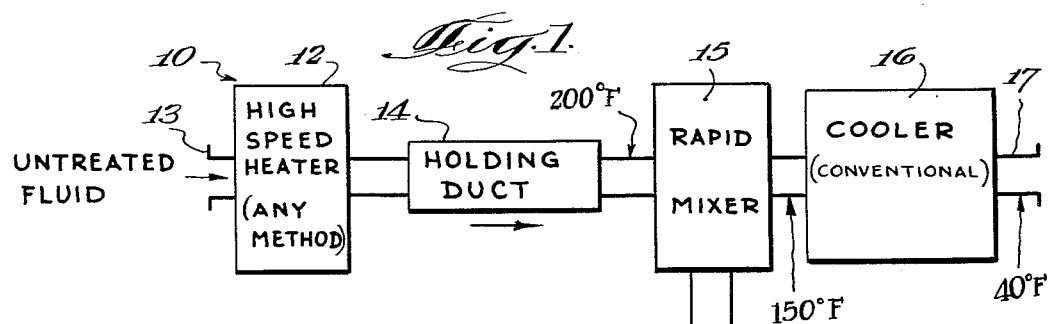
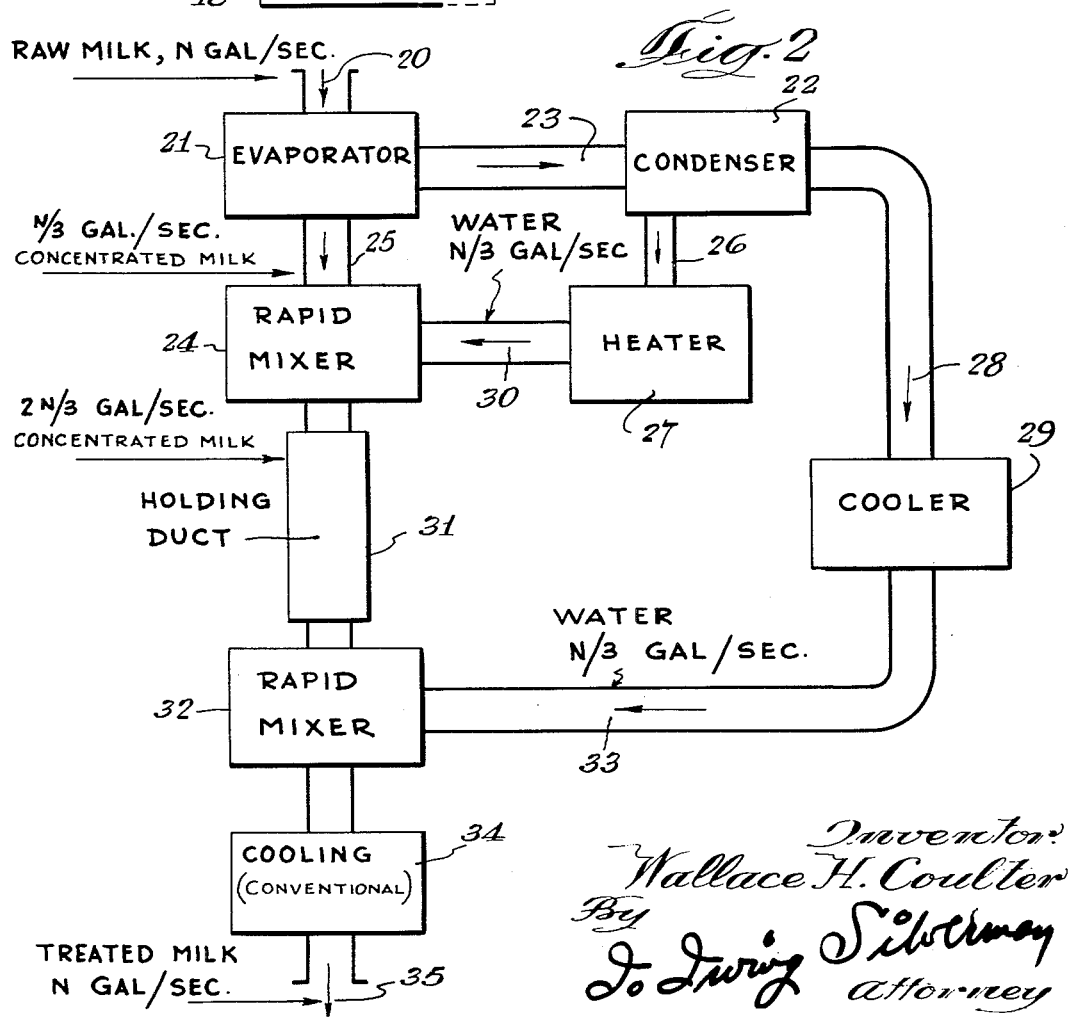

July 5, 1955

W. H. COULTER 2,712,504

METHOD FOR TREATMENT OF FLUIDS REQUIRING
STERILIZATION OR PASTEURIZATION

Filed Aug. 24, 1951

2 Sheets-Sheet 2

Inventor
Wallace H. Coulter
By J. Irving Silverman
Attorney

United States Patent Office 2,712,504
Patented July 5, 1955

2,712,504

METHOD FOR TREATMENT OF FLUIDS REQUIRING STERILIZATION OR PASTEURIZATION

Wallace H. Coulter, Chicago, Ill.

Application August 24, 1951, Serial No. 243,478

5 Claims. (Cl. 99—212)

This invention relates generally to the art of treatment of fluids requiring sterilization or pasteurization and storage. Such fluids comprise for example foods such as milk which need be treated by heating in order to render the same safe for consumption. The method is concerned with the heating and the cooling of such fluids in manners to achieve pasteurization or sterilization in a simple and economical manner, and yet effectively, with less effect on taste than heretofore possible.

Many fluids used for human consumption require treatment to destroy or substantially reduce the number of micro-organisms such as bacteria carried by the fluids. Pasteurization of dairy products is almost universal and sterilization is also very common. Commercial methods of pasteurization and sterilization are all based upon the concept of heating the fluid to a given temperature and holding the same at that temperature to achieve the desired effect. A common method of pasteurization for example, is to heat raw milk to approximately 140° F. or a little better, for a length of time in the vicinity of half an hour.

It has been known that by increasing the temperature at which the fluid is maintained the time required to accomplish a given treatment is materially decreased. The effect on living organisms in milk, for example, increases at a much greater rate with rising temperatures than the effect on taste and other properties. In other words the time factor for a given effect on bacteria count can be greatly reduced as the temperature is increased with an increasingly small effect on palatibility. For example milk pasteurization at 170° F. for 10 to 15 seconds is more complete than the older method of 140° F. for 30 minutes and the effect on taste is less. Temperatures much higher than 170° F. while much desired for more complete pasteurization, have heretofore been impractical and economically unfeasible.

The logical end to such requirements, namely the application of higher temperatures to achieve treatment desired with decreasing effect on taste, effectively is thwarted by limitations of presently employed methods, and indeed all methods known which are economically feasible. The primary obstacle is that the short time intervals cannot be achieved by such prior methods. Although the problem has been understood for many years, and although because of the great need many investigators have explored the field, no satisfactory solution heretofore has been presented to my knowledge. Known methods suffer either from inability rapidly to raise and/or lower temperatures or from adverse taste effects caused by contaminated heat transfer surfaces or electrodes in the case of direct contact electrical heating.

The invention contemplates a product which is economically heat treated, whether pasteurized or sterilized, with less effect on taste than heretofore has been believed possible.

Another important factor in the treatment of milk, for example, by heating the same, is the fact that milk is a staple food and is available in large quantities at relatively low price. The cost of high speed sterilization by known methods is expensive and if reflected in the eventual consumers price will form a very substantial part of that price. This factor, together with the fact that milk handling equipment contaminates easily and must be constructed to permit easy disassembly thereof has more or less thwarted and retarded the wide spread use of high speed milk pasteurization and sterilization even by the use of known methods.

As far as I have been able to determine, there is no commercially successful high speed milk sterilization installation in use at this time despite the great advantages and salutary results that would flow from a practical and feasible method. Furthermore, those installations that have been produced are either experimental in nature or require such expensive and complex apparatus, such as for example radio frequency heating, as to make their possibilities of wide-spread adoption and economic operation quite remote.

My invention principally contemplates a method for the economical and practical heating of perishable fluids to high temperatures for pasteurization or sterilization thereof, such heating to occur in a matter of a fraction of a second and enabling treatment of large volumes of fluid with relatively compact and simple apparatus.

Accordingly the principal object of this invention is to provide such method.

A further object of the invention is to accomplish the rapid heating or cooling of perishable fluids by intermixing the same with other fluids of different temperature whereby quickly to achieve a mean temperature without the necessity of using expensive apparatus.

Still a further object of the invention is to provide a method of sterilizing or pasteurizing milk or other perishable fluids which includes separating the fluid into different components which are and which are not heat sensitive and treating the components in different manners and thereafter bringing the same together, whereby not to affect the heat sensitive component.

Still a further object of the invention is to provide a method for pasteurization or sterilization of a fluid in which cooling is accomplished by the utilization of previously cooled fluid which has already been processed to bring down the temperature of a second batch of fluid processed in a parallel operation.

Many other objects will appear as the description of the invention proceeds. In order to assure a complete understanding thereof I have described in detail certain preferred embodiments of the apparatus in connection with which I will describe my preferred methods. It should be appreciated that numerous variations are possible without in any way departing from the spirit or scope of the invention. Consequently, in illustrations of the apparatus I have designated the elements thereof diagrammatically in order not to be limited to any particular construction of such apparatus.

Figure 4:
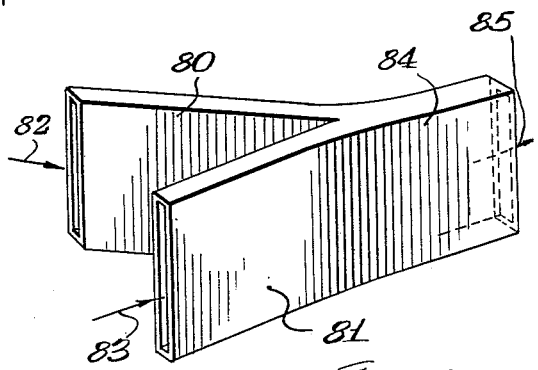

Figs. 1 to 3 inclusive are flow diagrams illustrating the invention, and Fig. 4 is a perspective view of a type of mixing device enabling speedy and thorough mixing of two fluids of different temperatures as required in connection with certain phases of my invention.

Basically the invention resides in the mixing of fluids for the purpose of achieving high or low temperatures in very short intervals of time. Certain phases of the invention have to do with re-circulation of fluid for the above purpose, and I have described novel methods and apparatus for doing this. Further phases of the invention have to do with high speed heating apparatus which is believed novel and more economical than similar devices heretofore known, and the methods of incorporating such apparatus in a system for pasteurizing or sterilizing perishable fluids.

In connection with the above principles of my invention, considerable variation therefrom has been set forth. In one method I heat the fluid in a rapid manner and then mix tthe fluid with another quantity of the fluid which has been heated in the same or a different manner and cooled by some method. In one method I may separate the fluid into different components and subject each component to a different process depending upon its stability and reaction to such process, and thereafter mix the components. A variation of this method is to remove moisture from the fluid, and then treat the remainder in a given manner, injecting into the stream heated or cooled water for mixing and temperature varying purposes. In still another arrangement, I have a cooling and re-circulating system connected with a continuous treating process system which, from an overall viewpoint, quickly heats the fluid and then quickly cools the same.

Many other variations of the methods and apparatus of the invention are possible, using both known methods of cooling or heating, and methods involving apparatus described herein. By suitable intermixture of different batches of the fluid at different temperatures, the desired results are obtained.

Referring now to the drawings, in Fig. 1 there is shown a simple manner of carrying out my invention. This figure illustrates a system wherein the output of a complete heating and cooling system is used to cool the heated output of a processing device which does not include a cooling phase. In this manner, the already cooled fluid is used to bring the temperature of the output of the heating system to an intermediate temperature and thereby a great economy is effected.

Specifically, there are two systems illustrated in Fig. 1 which can be termed the primary system 10 and the secondary system 11. The primary system 10 comprises a high speed heater 12 into which is directed a stream of the untreated fluid by way of inlet 13. Any method which is known can be used for this purpose. The fluid is directed into a holding duct 14 in which the temperature is maintained at a given level, say 200° F. for a time determined by the characteristics thereof and the requirements. In the event the heating apparatus of Fig. 4 is used, the holding duct 14 is not used. There are other factors involved which will be discussed hereinafter. From this point the fluid enters a rapid mixing device 15 which may be of a construction shown in Figs. 4 or 5, from whence it passes into a cooling device which may be of conventional construction. The rapid mixer 15 is a high speed cooling device. The outlet 17 may lead to storage means.

The secondary system 11 has fluid entering the inlet 18 and being processed in some system generally designated 19. This system need not be any particular type. It could for example be of a type shown and described in U. S. Patent No. 2,510,796, either with or without additional cooling apparatus. The processor 19 feeds fluid through conduit 20 into the rapid mixer 15 where, because of its low temperature, the fluid serves to cool the high temperature fluid coming from the holding duct 14.

The advantages of this particular system lie particularly in its economy although speed is also a factor. The use of refrigerative means for cooling fluids is well known, but expensive. The utilization of a complete system such as indicated at 19 is now known, but is also expensive. My system eliminates much apparatus because cooling is accomplished by the rapid and efficient mixing of a cool complete fluid, which has been processed by some method, with a hot complete fluid. The important factor is the sudden dropping of temperature, which in this case is shown as a drop from 200° F. to 100° F. accomplished by the fluid of 40° F. This is a critical phase of the process and must be done quickly.

By the same token, the use of heated complete fluids can be used to bring other cooler fluids up to desired temperatures in a short time. This may not be of great value insofar as sterilization and pasteurization of dairy products is concerned due to the temperature gradients and the speeds desired, but it may have application in other industries.

Thus far I have considered only the intermixture of whole fluids without first evaporating the same and using hot or cold water to heat or cool same, or what amounts to the same thing, adding hot or cold water during the process and evaporating later. Under these circumstances, the use of heated water to bring temperatures quickly up to a desired high value is economical, even in the case of milk. This will be described in some detail in connection with Fig. 2.

Obviously the combined output of the fluid from port 17 may be used to cool other fluid streams to intermediate temperatures, such that a large system can result in which the savings are substantial.

In Fig. 2 there is illustrated another phase of the invention the efficacy and advantages of which are all engendered by virtue of the high speed intermixture of the fluid of two different streams at different temperatures whereby to effect a temperature change desired.

The additional feature of the system of Fig. 2 is the separation of the incoming fluid into components which are separately treated and then re-united to produce the final product of the same properties as originally, except sterilized or pasteurized by high speed methods. For example, in the case of milk, the fluid can be separated into water or water vapor, and condensed or concentrated milk. The water or water vapor can be heated much higher and easier than the milk because of the precautions that must be taken with milk to prevent cooked taste, etc. Furthermore there is no time element involved in heating water or in cooling the same fairly economically. Its combinations with the condensed fluid are equally effective for cooling and for heating.

In Fig. 2 I have shown a stream of some untreated fluid entering the system, separated into two components, the heat sensitive portion and the non-heat sensitive portion. For convenience I have presumed the fluid to be raw milk, which separates into the concentrated milk and water, in the proportions of one to two respectively. Thus, raw milk enters the evaporator 21, and one third passes on to the rapid mixer 24 through conduit 25, while two thirds is converted into water vapor and is diverted through conduit 23 to the condenser 22. Half of the condenser output passes by way of conduit 26 to a heater 27 which may raise the temperature of the concentrated milk by rapid and thorough intermixture by any means such as described hereinafter. The water passes into the rapid mixer 24 through conduit 30 from the heater 27.

The second half of the condenser output is directed by the duct 28 to a cooler 29 which is connected by the duct 33 to another rapid mixer 32. Between the two rapid mixers, the milk is maintained at its high temperature acquired in rapid mixer 24, passing down a holding duct 31 of suitable construction. Thereafter the fluid passes to a conventional cooler 34 and out the port 35 to storage facilities.

This system illustrates that the separation of the fluid into its heat sensitive and non-heat sensitive components enables the insensitive components to be heated or cooled to temperatures quite a good deal different from that of the sensitive components, so that the heated or cooled insensitive parts can be used for achieving a product having a desired temperature easily and conveniently.

This is done through high speed mixing in suitable apparatus. Obviously the attainment of various temperatures by this means eliminates apparatus otherwise required which is costly both from cost and maintenance standpoints.

This method of sterilizing or pasteurizing fluid is capable of modification in a manner which, under certain circumstances may result in a very economical overall system. This is especially true where sterile hot water or steam is used in a given plant for some other purpose so that it can be supplied to this apparatus easily.

This method is illustrated in Fig. 3. The basic principle involved is the supplying of fluid to the stream which is later removed, but which supplied fluid is easier and more economical to heat or cool than the principal fluid. In Fig. 2, there is an actual separation of the principal fluid into two parts which are treated separately. Thus in Fig. 3, water is used to heat the principal fluid and is also used to cool the principal fluid, the total amount added being later removed by some suitable means such as evaporation in the case of milk. Raw milk, for example, is shown entering the apparatus at 40 and being rapidly mixed with sterile hot water or steam to bring its temperature up to the desired value in the rapid mixer 41. The sterile water enters the rapid mixer through the port 42. From the rapid mixer 41 the fluid passes into a holding duct 43 where it is maintained at the desired intermediate temperature for the required length of time. It will be seen from the drawing that a supposed system for treatment of milk utilizes equal proportions of raw milk and hot water.

From the holding duct 43 the fluid passes into a second rapid mixer 45 in which the fluid is quickly cooled. A volume of cold water is introduced at 46 in a quantity such that the cooled fluid coming out of the second rapid mixer by way of conduit 48 is three times the original volume introduced at 40. In other words, N gallons per second of raw milk are introduced at 40, N gallons per second of hot water are introduced at 42, and N gallons per second of cold water are introduced at 46. Obviously the water is sterilized, and the cold water may have been obtained after cooling from the source of hot water.

Thereafter the 3N gallons per second of milk and water may be cooled in a conventional cooler 49 and passed through conduit 50 to the evaporator 51 where two thirds removal of the water will reduce the volume of milk flowing out the port 47 to N gallons per second.

In the apparatus shown in Figs. 2 and 3 and the methods described for use therewith, it is feasible and desirable, under suitable conditions to use steam instead of hot water. Thus in Fig. 2, heater 27 may be a steam generator, while in Fig. 3, the conduit 42 may be a steam line. For a given amount of moisture considerably greater heat can be carried by steam than hot water. Thus in Fig. 2, the greater part of the output of the condenser 22 may be directed into conduit 28 to give a larger cooling volume for intermixture with fluid passing into mixer 32. In Fig. 3, the use of steam at 41 will increase economy by decreasing the amount of dilution of the fluid, and hence the expense required for evaporation.

Another refinement for the method and apparatus illustrated in Figs. 2 and 3 consists of a pre-heating of the fluid prior to its entry into the first rapid mixer, 24 or 40. Such pre-heating, easily done by conventional methods, may consist in bringing the temperature of the fluid, for example milk, up to 150°–160° F. It decreases the heat requirements of the hot stream being introduced to the rapid mixer to raise the temperature of the fluid.

Incidentally, the end product of my process need not be the fluid having the same composition as when the process is started. Such end product may be diluted or concentrated, leaving the purchaser to add or remove moisture as the case may be, and hence the invention need not be limited by an inclusion of the steps of final evaporation or addition of water.

In Fig. 4 I have illustrated one expedient for rapid mixing of fluids at high speed. There is provided a pair of conduits 80 and 81, having fluid streams 82 and 83 respectively entering the same. The conduits join to form a single juncture conduit 84 so that the streams 82 and 83 commingle to produce the stream 85 whose temperature is some intermediate value. It will be noted that the branches 80 and 81 have their bores of such geometry as to force the streams therein to flow as very thin sheets of fluid. Therefore, when the streams join and pass into a single conduit whose inner geometry is also such as to provide a thin sheet of fluid, the intermixing will be thorough and rapid.

The exact configuration shown need not be used, nor is my invention limited thereto. The requirements of rapid and thorough mixing are that the streams joining have a high ratio of mating surface to mass or cross-section so that there will be a rapid exchange of heat between the two streams. The streams should have a high ratio of surface area to cross section area to meet this requirement, and this can be accomplished by the use of conduits of the type illustrated in Fig. 4. Another way of doing the same thing would be to have many streams of circular cross section but very small diameters. Turbulence, no matter how induced, is also helpful to assure rapid intermixture, and this can be accomplished by having the velocities of the conjoining streams different, by having the state of the matter different, or by geometrically inducing the turbulence in any suitable manner. The construction of the device of Fig. 4 and similar constructions have the advantage of simplicity and ease of cleaning.

It is believed that the invention has been sufficiently described to enable those skilled in the art to which same pertains to understand and appreciate the advance I have made in the arts and sciences. It should be appreciated that the methods described are characteristic of the invention and not intended by way of limitation. The methods described in the sterilization or pasteurization of fluids may utilize apparatus described in details herein, such as for example, the mixing devices of my invention; or they may utilize apparatus known in the art. The invention also is directed to the methods described, including the method involving separating a fluid into components having different heat sensitivity, and then re-combining the components in temperature raising action or lowering action; achieving variations in temperature by the high speed intermixing of fluids of different temperatures; and raising the temperature of fluids and lowering same in the other manners described above and claimed hereinafter.

The nature of the invention is such that considerable variation in details is quite possible without in any way departing from the scope of the invention as defined by the appended claims.

What I claim and desire to secure by Letters Patent of the United States is:

1. The method of treating a fluid requiring sterilization or pasteurization in continuous flow process which comprises separating the fluid into heat sensitive and non-heat sensitive components, raising the temperature of a non-heat sensitive component to a value not readily attainable in said heat sensitive components without deleterious effects thereon, then raising the temperature of the heat sensitive components to the desired sterilizing or pasteurizing value by rapidly intermixing the heated non-heat sensitive component therewith, and then rapidly cooling the same.

2. The method described in claim 1 in which a portion of non-heat sensitive component is cooled to a relatively low value and intermixed with the above referred to heated mixture to achieve said rapid cooling of said mixture.

3. The method of treating a fluid requiring sterilization or pasteurization in continuous flow process, which comprises, removing from the fluid the non-heat sensitive component, rapidly heating the fluid to a desired temperature, then rapidly cooling the same, the heating and cooling being accomplished by inter-mixing with the said heat sensitive component first a stream of non-heat sensitive fluid at a high temperature and then a stream of non-heat sensitive fluid at a low temperature, the temperatures being such that the resultants are the desired high and low values, and the amount of the added fluids being such that the final product is substantially the same in composition as that of the first mentioned fluid.

4. The method of treating milk which comprises evaporating the milk to concentrate the same, then heating the same rapidly to sterilize the same by rapidly intermixing the same with heated water, then suddenly lowering the temperature thereof by rapidly intermixing the same with sterile cold water, the amounts of moisture introduced being substantially equal to the amount evaporated.

5. A method as described in claim 4 in which the moisture is introduced to the fluid prior to evaporation, and in which the amount of water evaporated is substantially equal to the amount introduced.

References Cited in the file of this patent

UNITED STATES PATENTS

| | | |
|---|---|---|
| 1,168,823 | Nielsen | Jan. 18, 1916 |
| 2,003,454 | Murray | June 4, 1935 |
| 2,022,420 | Hammer et al. | Nov. 26, 1935 |
| 2,091,606 | Murray | Aug. 31, 1937 |
| 2,130,643 | Hammer et al. | Sept. 20, 1938 |
| 2,207,817 | Parker et al. | July 16, 1940 |
| 2,239,397 | North et al. | Apr. 22, 1941 |
| 2,331,895 | Dunmire | Oct. 19, 1943 |
| 2,417,950 | Rothwell | Mar. 25, 1947 |